US005241858A

United States Patent [19]

Wieczorek et al.

[11] Patent Number: 5,241,858

[45] Date of Patent: Sep. 7, 1993

[54] DYNAMIC FLOW CALIBRATION OF A FUEL INJECTOR BY SELECTIVE DIVERSION OF MAGNETIC FLUX FROM THE WORKING GAP

[75] Inventors: David P. Wieczorek; Thomas A. Sumrak, both of Newport News, Va.

[73] Assignee: Siemens Automotive L.P., Auburn Hills, Mich.

[21] Appl. No.: 805,347

[22] Filed: Dec. 9, 1991

[51] Int. Cl.[5] .......... G01M 19/00

[52] U.S. Cl. .......... 73/119 A; 239/533.12

[58] Field of Search .......... 73/119 A, 3; 239/533.6, 239/533.12, 585.1

[56] References Cited

FOREIGN PATENT DOCUMENTS 3803436 8/1989 Fed. Rep. of Germany ... 73/119 A

*Primary Examiner*—Jerry W. Myracle

*Attorney, Agent, or Firm*—George L. Boller; Russel C. Wells

[57] ABSTRACT

An electromagnetically operated fuel injector has a dynamic flow calibration mechanism in which a control rod that extends between and enters holes in both the stator and the armature is selectively positioned to divert some of the magnetic flux from the axial working gap between the stator and the armature such that the diverted magnetic flux passes through the control rod directly between the stator and the armature without passing through the working gap. A non-magnetic tube is disposed between the control rod and the stator and armature holes. The portion of that tube which is within the stator hole is joined to the stator while the portion which is within the armature hole provides guidance for the armature. In a bottom-feed version of fuel injector the tube also serves to prevent fuel within the injector from wetting the control rod. The fuel injector is dynamically calibrated by selectively positioning the control rod by use of an external tool that engages the control rod so that the diverted flux which is conducted between the stator and the armature is conducted through the control rod without passing through the working gap.

13 Claims, 7 Drawing Sheets

DYNAMIC FLOW CALIBRATION OF A FUEL INJECTOR BY SELECTIVE DIVERSION OF MAGNETIC FLUX FROM THE WORKING GAP

FIELD OF THE INVENTION

This invention relates to electromagnetic operated fuel injectors of the type used in the fuel systems of internal combustion engines that power automotive vehicles, especially to the dynamic flow calibration of such fuel injectors.

BACKGROUND AND SUMMARY OF THE INVENTION

It is known to calibrate a fuel injector's dynamic flow by selectively setting the degree of compression of a spring that acts on the armature. This is because the dynamic flow is a function of the response time of the fuel injector, and the response time of the fuel injector is in turn a function of the degree of spring compression. In a top-feed type fuel injector, such calibration is accomplished by using a hollow tube to compress the spring while the flow is being measured, and then staking the tube in place after the desired flow has been attained. The use of a hollow tube allows the liquid fuel to be fed through the means of adjustment and does not require any sort of fluidic seal. A bottom-feed type fuel injector is dynamically calibrated by using a solid adjusting pin to compress the spring, but a fluid seal is required to contain the fuel since the fuel inlet to the fuel injector is located closely adjacent the fuel outlet from the fuel injector.

In many automotive vehicles, the increasing scarcity of available space within the engine compartment has created a demand for miniaturized fuel injectors. The ability to decrease the size of a top-feed fuel injector is limited by the requirement that the size of the fuel hole through the adjusting tube be large enough to accommodate the maximum fuel flow without imposing an unacceptable restriction to that flow. While a bottom-feed fuel injector that is dynamically calibrated in the manner described above requires no fuel hole through the adjusting pin, it is necessary that a sealing means be provided around the calibration means. Such a sealing means occupies space and therefore inhibits the ability to miniaturize that type of fuel injector.

Commonly assigned co-pending application Ser. No. 07/738,653 filed Jul. 31, 1991 now U.S. Pat. No. 5,517,967 discloses an invention which attains a desired dynamic flow calibration by the creation of a desired condition for the forces acting on the fuel injector's armature. This is accomplished by the selective relative positioning of the injector's stator/armature interface to the injector's solenoid coil. Two specific advantages of the invention that allow for fuel injector miniaturization include the elimination of the need for a fluid sealing means around the means which selectively sets the dynamic calibration, and the ability to perform the dynamic calibration in a very small amount of space. Increased resolution within the calibration range is yet another advantage.

Like the invention of Ser. No. 07/738,653, the present invention relates to a new and improved method for dynamic flow calibration of an electromagnetically operated fuel injector which renders the fuel injector more conducive to miniaturization. The invention also relates to a novel construction for an electromagnetically operated fuel injector that promotes the efficient practice of the method, particularly in the automated mass-production fabrication of such fuel injectors.

Briefly, the present invention relates to a fuel injector in which a control rod is positioned in relation to the stator and armature during dynamic flow calibration to selectively divert some of the magnetic flux from the working gap by causing the diverted magnetic flux to pass directly between the stator and the armature without passing through the working gap. The fuel injector also includes a non-magnetic tube disposed between the control rod and holes in the stator and armature through which the control rod passes. The portion of that tube which is within the stator hole is joined to the stator while the portion which is within the armature hole provides guidance for the armature. In a bottom-feed version of the fuel injector, the tube serves to prevent fuel within the injector from wetting the control rod. The fuel injector is dynamically calibrated by selectively positioning the control rod by means of an external tool that engages the control rod.

The foregoing, along with additional features, advantages, and benefits of the invention will be seen in the ensuing description and claims which should be considered in conjunction with the accompanying drawings. The drawings disclose a presently preferred embodiment of the invention in accordance with the best mode contemplated at the present time in carrying out the invention.

DESCRIPTION OF THE PREFERRED EMBODIMENT

Figure 1:
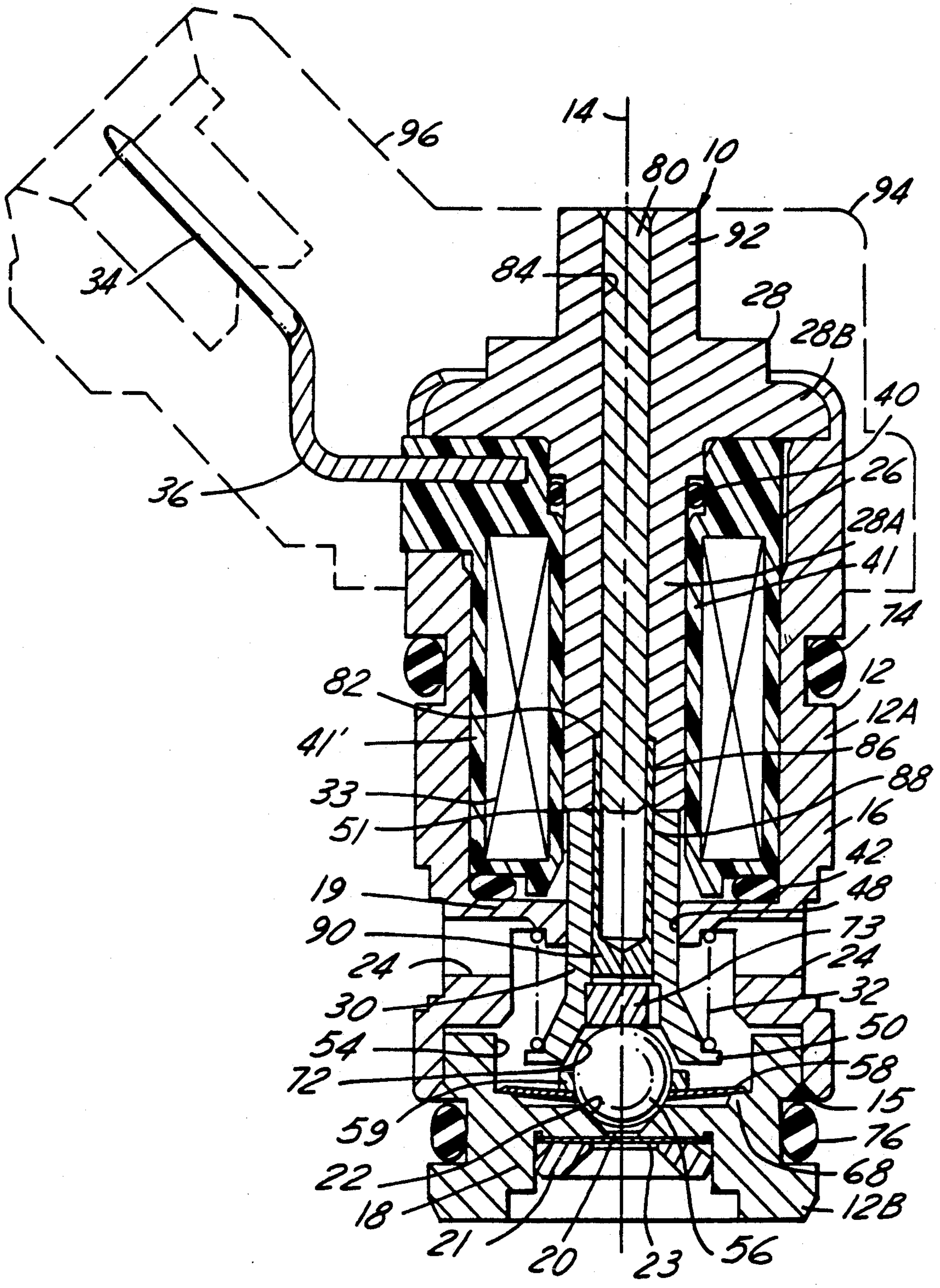
FIG. 1 is a longitudinal cross sectional view through a fuel injector embodying principles of the present invention at a particular stage of the injector fabrication process before dynamic flow calibration.

FIG. 1 shows an embodiment of electrically operated fuel injector 10 which comprises a body 12 having a main longitudinal axis 14. Body 12 is composed of two separate parts 12A, 12B which are joined together at a joint 15. Body 12 comprises a cylindrical side wall 16 which is generally coaxial with axis 14 and an end wall 18 that is disposed at one longitudinal end of side wall 16 generally transverse to axis 14. Part 12B contains end wall 18 and a portion of side wall 16. Part 12A contains the remainder of side wall 16, and it also comprises a transverse wall 19 which is spaced interiorly of end wall 18.

The nozzle, or tip, end of the fuel injector has a circular through-hole 20 that is provided in end wall 18 substantially coaxial with axis 14 to provide a fuel outlet from the interior of body 12. Through-hole 20 has a frusto-conical valve seat 22 at the axial end thereof which is at the interior of body 12. A thin disc orifice member 23 containing one or more orifices is disposed over the open exterior end of through-hole 20 so that the fuel that passes through through-hole 20 is emitted from the injector valve via such orifices. Member 23 is held in place on body 12 by means of an annular retainer 21 that is secured to part 12B, such as by staking.

Fuel injector 10 has a fuel inlet in the form of plural radial holes 24 that are circumferentially spaced apart around body 12 and extend through side wall 16. It also contains an internal fuel passage, to be hereinafter described in more detail, from the fuel inlet to the fuel outlet. Holes 24 are located immediately adjacent transverse interior wall 19, adjacent to the face thereof that is toward part 12B. The placement of the fuel inlet in the injector's side wall closely adjacent the outlet is representative of a configuration that is commonly called a bottom-feed type fuel injector.

Fuel injector 10 further comprises an electrical actuator mechanism which includes a solenoid coil assembly 26, a stator 28, an armature 30, and a bias spring 32. Solenoid coil assembly 26 has a generally tubular shape and comprises a length of magnet wire that has been wound to form an electromagnetic coil 33 whose terminations are joined to respective electrical terminals 34, 36 which project away from the body at an inclined angle. The terminals 34, 36 are configured for mating connection with respective terminals of an electrical connector plug (not shown) which is connected to the fuel injector when the fuel injector is in use. Coil 33 is wound on a bobbin and then encased by plastic encapsulation 41'. (The bobbin does not expressly appear in the drawings although the reference numeral 41 is used to indicate that portion of the bobbin lying between the bobbin flanges.) The fuel injector has a surround 94 of dielectric material including a shell 96 disposed in laterally bounding relation to electrical terminals 34, 36.

Stator 28 has a shape which provides for it to be cooperatively associated with solenoid coil assembly 26 in the manner shown in FIG. 1. The stator cooperates with body 12 in forming the magnetic circuit in which the magnetic flux that is generated by coil 33 when the coil is electrically energized is concentrated. Stator comprises a circular cylindrical shank 28A that fits closely within solenoid coil assembly 26 and a head 28B forming a generally circular flange that radially overlaps the upper end of solenoid coil assembly 26 as viewed in the drawing FIG. 1. The outer margin of head 28B abuts body 12 and the body is wrapped over it to unite the two in assembly.

Shank 28A is hydraulically sealed with respect to the inside diameter (I.D.) of bobbin portion 41 by means of an elastomeric O-ring seal 40. Seal 40 prevents fuel that has been introduced into the interior of the fuel injector via holes 24 from leaking out of the fuel injector via any potential leak paths that may exist between the external cylindrical surface of the stator shank and the internal cylindrical I.D. surface of the plastic encapsulation. The outside of solenoid coil assembly 26 is sealed with respect to the inside of side wall 16 by means of another O-ring seal 42.

Transverse interior wall 19 comprises a circular through-hole 48 that is coaxial with axis 14. Armature 30 has a generally circular cylindrical body that passes axially through through-hole 48. The portion of the armature that is disposed between walls 18 and 19 is enlarged to provide a circular flange 50 as a seat for one end of spring 32. The opposite end of the spring bears against wall 19 so that the spring serves to resiliently bias the armature downwardly, toward valve seat 22.

FIG. 1 illustrates the condition of the fuel injector when the solenoid coil assembly is not being energized. The resilient bias of spring 32 on armature 30 positions the armature so that a small axial working gap 51 exists at the stator/armature interface between the juxtaposed axial end faces of the stator shank and the armature body. When the solenoid coil is energized, the magnetic force exerted on the armature will move the armature toward the stator to reduce the working gap.

The valve element is a sphere 56 that in FIG. 1 is shown coaxial with axis 14 and forced by armature 30 to be seated on valve seat 22 so as to close through-hole 20. This represents the closed condition which the fuel injector assumes when solenoid coil assembly 26 is not electrically energized. The resilient bias of spring 32 acting through armature 30 causes sphere 56 to be forcefully held on seat 22.

Sphere 56 is a separate part that is constrained in a particular way so that it will follow the longitudinal motion of armature 30 when the latter is operated by the solenoid assembly, but in such a way that the sphere will always be self-centering on seat 22 when the fuel injector is operated closed.

Additional mechanism which cooperates with armature 30 in controlling sphere 56 is a resilient spring disc 58 which is disposed for coaction with sphere 56 by means of a collar, or pressed-on ring, 59, to be subsequently described. The shape of disc 58, which is representative of one of a number of possible designs, is circular and has a circumferentially uninterrupted radially outer margin, but contains a central through-aperture which defines a circular void of a diameter less than the diameter of sphere 56. It also defines one or more additional voids for the internal fuel passage through which fuel flows from inlet holes 24 to valve seat 22.

Disc 58 and sphere 56 are disposed in fuel injector 10 such that sphere 56 fills substantially the entirety of the central circular void in the disc. End wall 18 contains a raised annular ledge 68 surrounding seat 22 coaxial with axis 14. The circumferentially continuous outer peripheral margin of disc 58 rests on ledge 68. The diameter of the disc is less than the diameter of the surrounding wall surface 54 so that the disc is capable of a certain limited amount of radial displacement within the interior of body 12. The sphere includes a pressed-on ring 59 for support on disc 58 so that the two parts 56, 59 form a sphere/ring unit like that shown in commonly assigned co-pending patent application Ser. No. 07/684,619, filed Apr. 12, 1991.

In the closed condition shown in FIG. 1, the resilient bias force exerted by spring 32 acting through armature 30 on sphere 56, in addition to forcing the sphere to close through-hole 20, has also flexed spring disc 58 so that the spring disc is exerting a certain force on the sphere in the opposite direction from the force exerted by spring 32.

The energization of solenoid coil assembly 26 will exert an overpowering force on armature 30 to reduce gap 51 thereby further compressing spring 32 in the process. The resulting motion of the armature away from sphere 56 means that the dominant force applied to the sphere during this time is that which is exerted by disc 58 in the direction urging the sphere toward the armature. Disc 58 is designed through use of conventional engineering design calculations to cause the sphere to essentially follow the motion of the armature toward stator 28. The result is that the sphere unseats from seat 22 to allow the pressurized liquid fuel that is present within the interior of the fuel injector to pass through through-hole 20. So long as sphere 56 remains unseated from seat 22, fuel can flow from holes 24 to the fuel outlet at through-hole 20.

When solenoid assembly 26 is de-energized, the magnetic attraction force on armature 30 dissipates to allow spring 32, acting through the armature, to cause the sphere to re-seat on seat 22 and close through-hole 20. It is to be observed that the amount of longitudinal travel of the armature is quite small so that a portion of the sphere will always be disposed in seat 22 even though the sphere itself may not be closing through-hole 20 to fuel flow. If for any reason sphere 56 were to become eccentric with respect to seat 22, the reaction of the sphere with the valve seat in response to armature motion tending to close the valve will create a self-centering tendency toward correcting the eccentricity. This self-centering tendency is allowed to occur because disc 58 is unattached to the valve body, i.e. the disc is prevented from itself preventing the sphere from ultimately centering itself on the seat to close the through-hole. Stated another way, the sphere can "float" radially so that any eccentricity which may exist between the sphere and the seat is eliminated as the armature operates to force the sphere against the seat toward the final objective of closing the fuel outlet.

While the sphere has thus been shown to be axially captured between armature 30 and disc 58, there is also a certain radial confinement that is provided by the particular shape of the armature tip end. The tip end of the armature is shaped to have a frusto-conical surface 72 that is essentially coaxial with axis 14. When sphere 56 is seated on seat 22, surface 72 is spaced from the sphere. There is thus a limited range of radial displacement (eccentricity relative to axis 14) for the sphere which will be tolerated before surface 72 will actively prevent any further radial displacement of the sphere, provided that the sphere is otherwise allowed to be displaced radially sufficiently to abut surface 72. It is also to be observed that the armature is shown as a two-part construction comprising a main armature body and a hardened insert 73 which provides the contact surface with sphere 56 to axially capture the sphere.

In use, the injector is typically operated in a pulse width modulated fashion. The pulse width modulation creates axial reciprocation of the sphere so that fuel is injected as separate discrete injections. The exterior of side wall 16 contains axially spaced apart circular grooves which receive O-ring seals 74, 76 for sealing of body 12 to an injector-receiving socket into which a bottom-feed type injector is typically disposed when the injector is used on an automotive vehicle internal combustion engine.

If a constant pressure differential exists between the fuel inlet and the fuel outlet of the fuel injector, fuel injected per injection will be a function of the pulse width energization. The actual response of the fuel injector is a function of the set of forces acting on the actuating mechanism, and so to assure that a mass-produced fuel injector will comply with a dynamic flow specification, dynamic flow calibration may be performed. The present invention performs dynamic flow calibration by a mechanism which comprises a control rod 80 which is associated with stator 28 and armature 30. Also associated with that mechanism is a non-magnetic tube 82.

Stator 28 comprises a circular cylindrical through-hole 84 that is coaxial with axis 14 and that has a slightly larger counterbore 86 at its interior end. Armature 30 has a circular cylindrical hole 88 that is open toward counterbore 86 and that is also coaxial with axis 14. Tube 82 has a sidewall that is open at one axial end and closed by an end wall 90 at the other. The open end of the tube's sidewall is inserted with a close fit into counterbore 86. The two are joined in a sealed manner so that in this bottom-feed version fuel that has been introduced into the fuel injector via inlet holes 24 cannot intrude past the tube/stator joint and through the clearance between through-hole 84 and control rod 80 where it could wet the control rod and possibly escape the fuel injector. The end of tube 82 that contains end wall 90 provides axial guidance for armature 30 by having a close fit within hole 88. With the inclusion of the dynamic calibration mechanism in the fuel injector, working gap 51 may be considered to have an annular shape.

Figure 2:
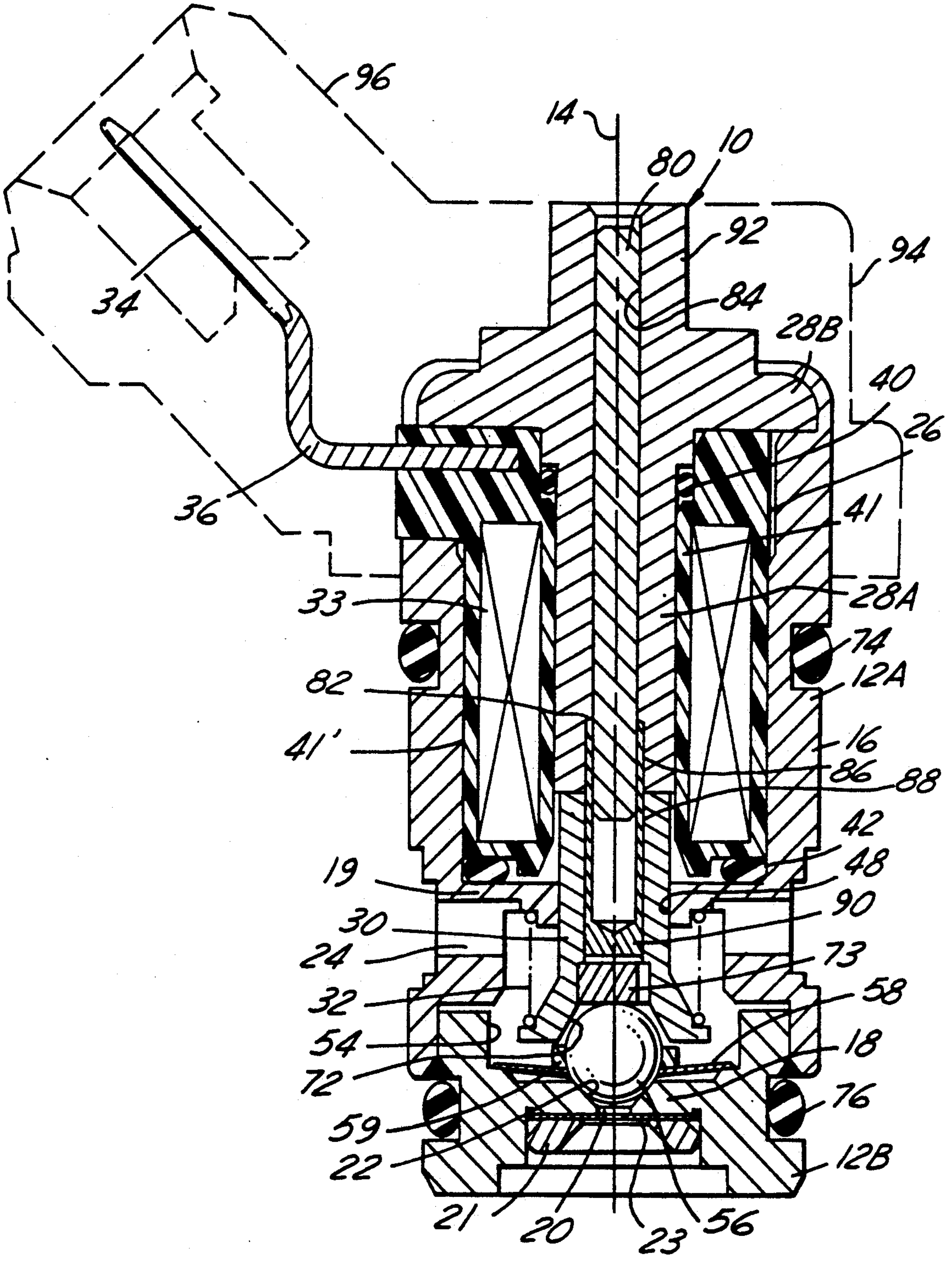
FIG. 2 is a view like that of FIG. 1 after completion of dynamic flow calibration.

FIG. 1 depicts a representative position of control rod 80 before the fuel injector is dynamically calibrated. It will be observed that the flat interior axial end face of the control rod occupies essentially the same plane as the annular-shaped flat axial end face of stator shank 28A. Dynamic flow calibration is performed by operating the fuel injector under a given set of operating conditions, and concurrently measuring the dynamic flow. The measured flow is compared with a desired flow. If the comparison is satisfactory, no re-positioning of the control rod from the FIG. 1 position is needed. That being the case, the control rod is then immovably joined to the stator, and one way of performing this joining is by crimping a small cylindrical protrusion 92 on the end of head 28B to the control rod. If the comparison is unsatisfactory, then adjustment of the control rod, by axially advancing it further into the fuel injector, is needed. Thus, the control rod is advanced into the fuel injector until the desired dynamic flow is measured. Thereafter, the control rod is immovably united with the stator in the manner just described, and the fuel injector is deemed to have proper dynamic flow calibration. FIG. 2 shows the position of the control rod after the completion of such dynamic calibration.

In FIG. 2 it can be seen that the flat axial end face of the control rod, which was previously substantially flush with the end face of stator shank 28A, has been disposed axially beyond working gap 51. Since the control rod, like the stator, is a magnetically permeable material, both the control rod and the stator shank 28A conduct the magnetic flux that passes axially through coil assembly 26 when the solenoid is electrically energized. With the control rod in the FIG. 1 position, substantially the entire magnetic flux is conducted across the axial working gap. In this position maximum electromagnetic force is exerted on the armature for a given current in the solenoid coil, and the fuel injector will exhibit maximum dynamic flow.

As the control rod is increasingly advanced into the armature, it increasingly diverts from working gap 51, the flux that passes through the coil assembly. Accordingly, there is correspondingly less flux that acts across the axial working gap, and for a given current, the force exerted on the armature is correspondingly less and the fuel injector will therefore exhibit a decreasing dynamic flow. Such decrease in dynamic flow is the result of a decreased acceleration of the armature upon solenoid coil energization and therefore a slower opening motion of the injector.

Actual results on a working embodiment of fuel injector are shown in FIGS. 5–9. The total movement of the control rod is 0.075 inch which provides an adjustment range for the dynamic flow in the order of 10%-15%. Adjustability is limited by the flux-carrying capability of the control rod, and the resolution of adjustment is dependent on the length of control rod/armature overlap necessary to achieve maximum diversion of the flux. Once the control has been inserted a certain distance, further insertion produces very little additional change in armature response. The minimum length of control rod is determined by its ability to radially transmit magnetic flux in an amount equivalent to the axial flux diverted down the control rod's cylindrical cross section.

Dynamic flow calibration according to the invention has the further advantage over the technique first mentioned in the beginning of increased resolution; a typical spring-biased injector would have only about 0.030 inch adjustment movement to accomplish the same results as in 0.075 inch of available movement in the example of the present invention.

It is contemplated that automatic equipment can perform the dynamic flow calibration. Such equipment will have a tool that engages the control rod. Such a tool positions the control rod until the proper insertion depth is obtained, and in that case the control rod can be a simple cylinder as shown. If it is necessary for the tool to move the control rod in the direction of extraction, suitable provisions must be made either in the tool, in the control rod, or in both to allow the control rod to be grasped by the tool.

Figure 3:
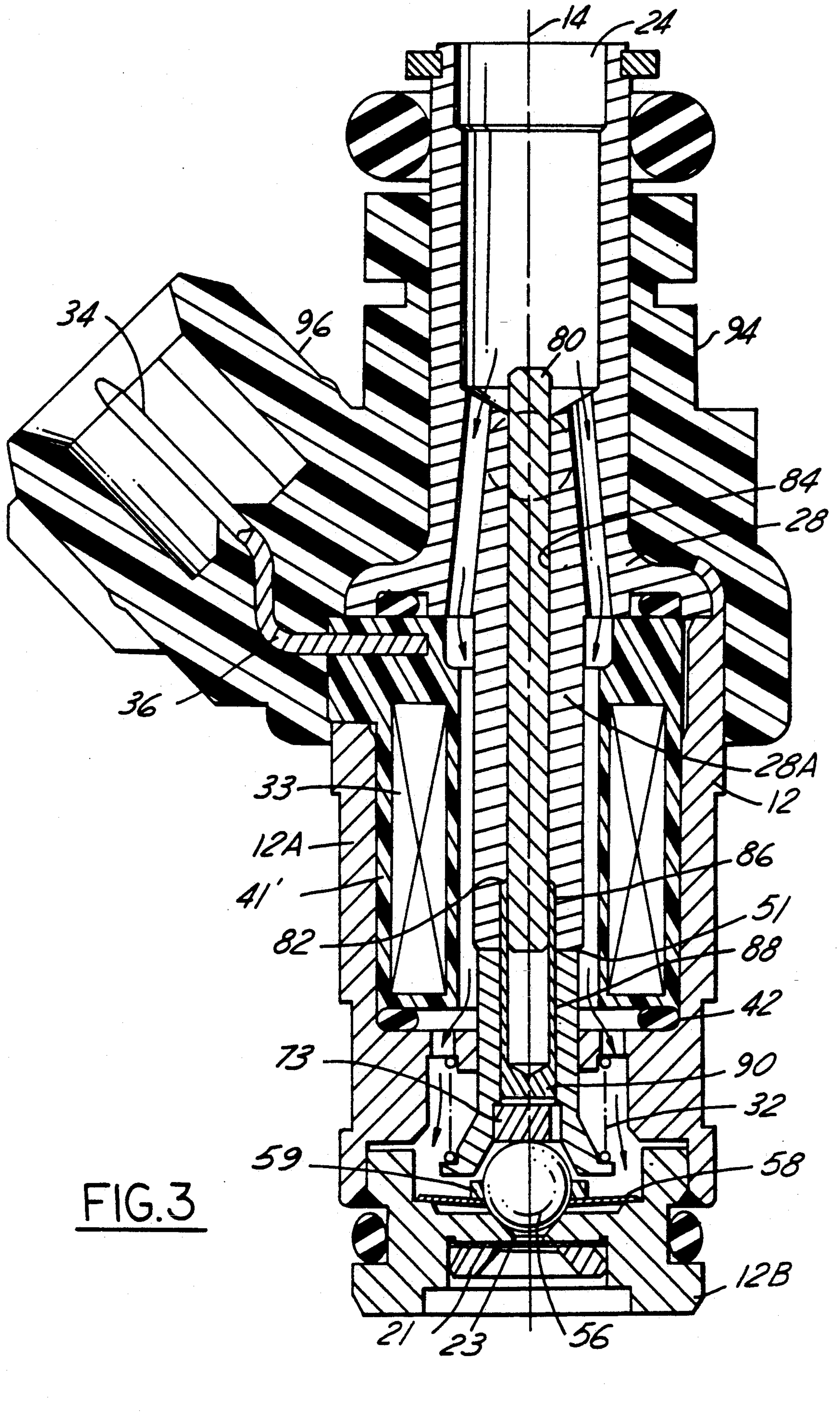
FIG. 3 is a view like that of FIG. 1, but of another embodiment, after completion of the fabrication process, but before dynamic flow calibration.
Figure 4:
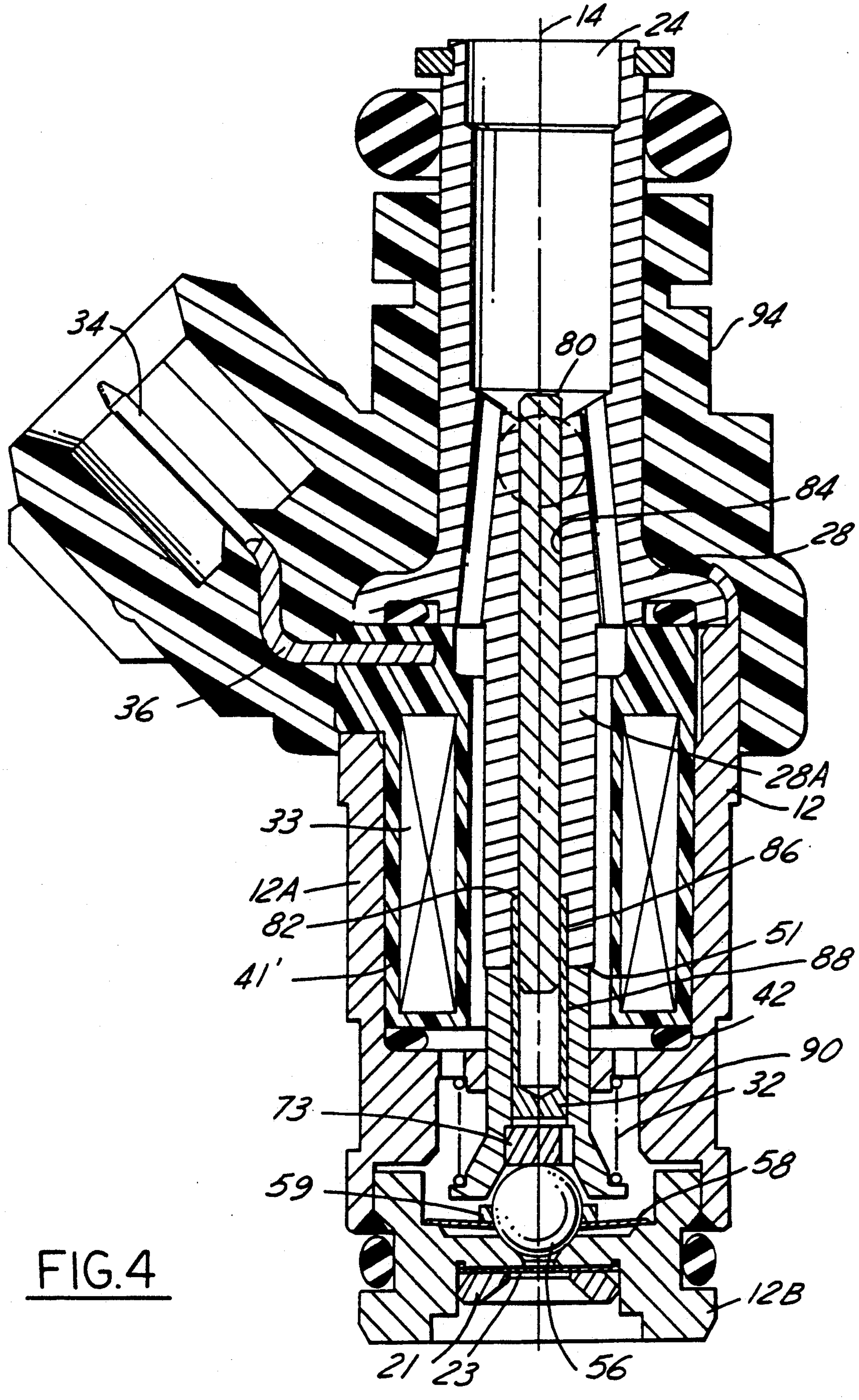
FIG. 4 is a view like that of FIG. 3 after completion of dynamic flow calibration.
Figure 5:
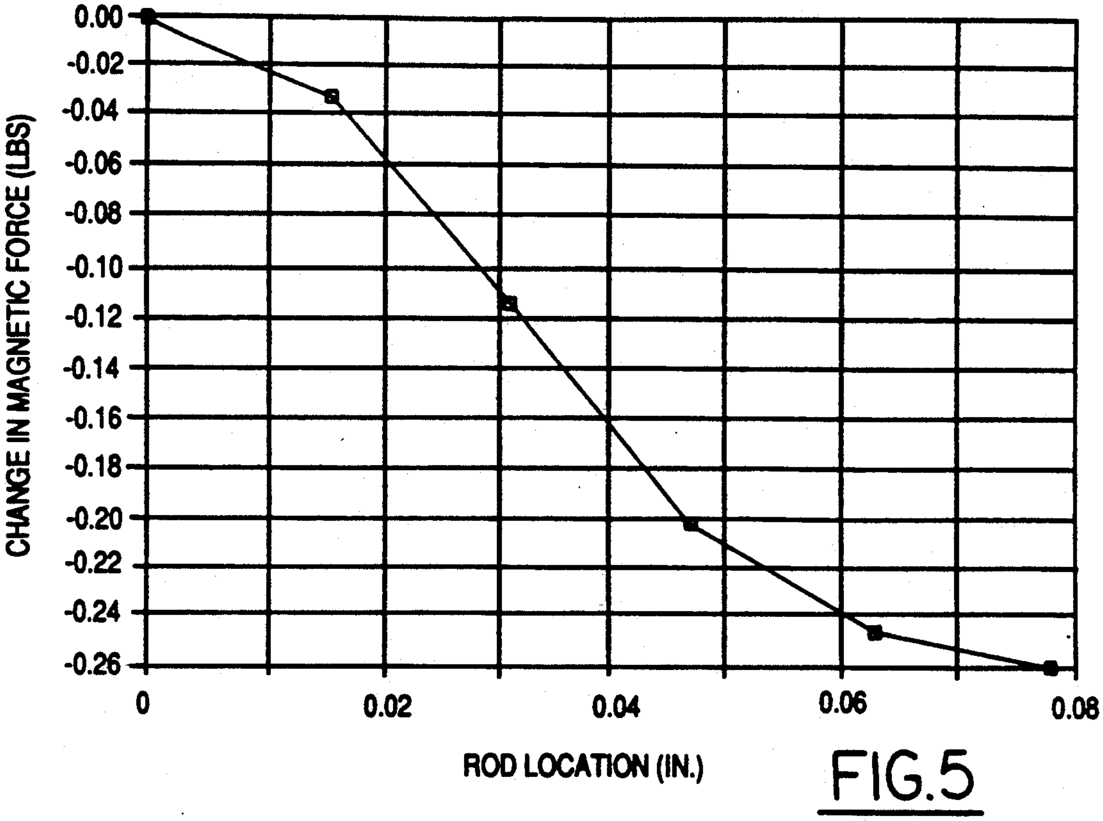
FIGS. 5–9 are several graph plots illustrating the effect of using principles of the invention.
Figure 6:
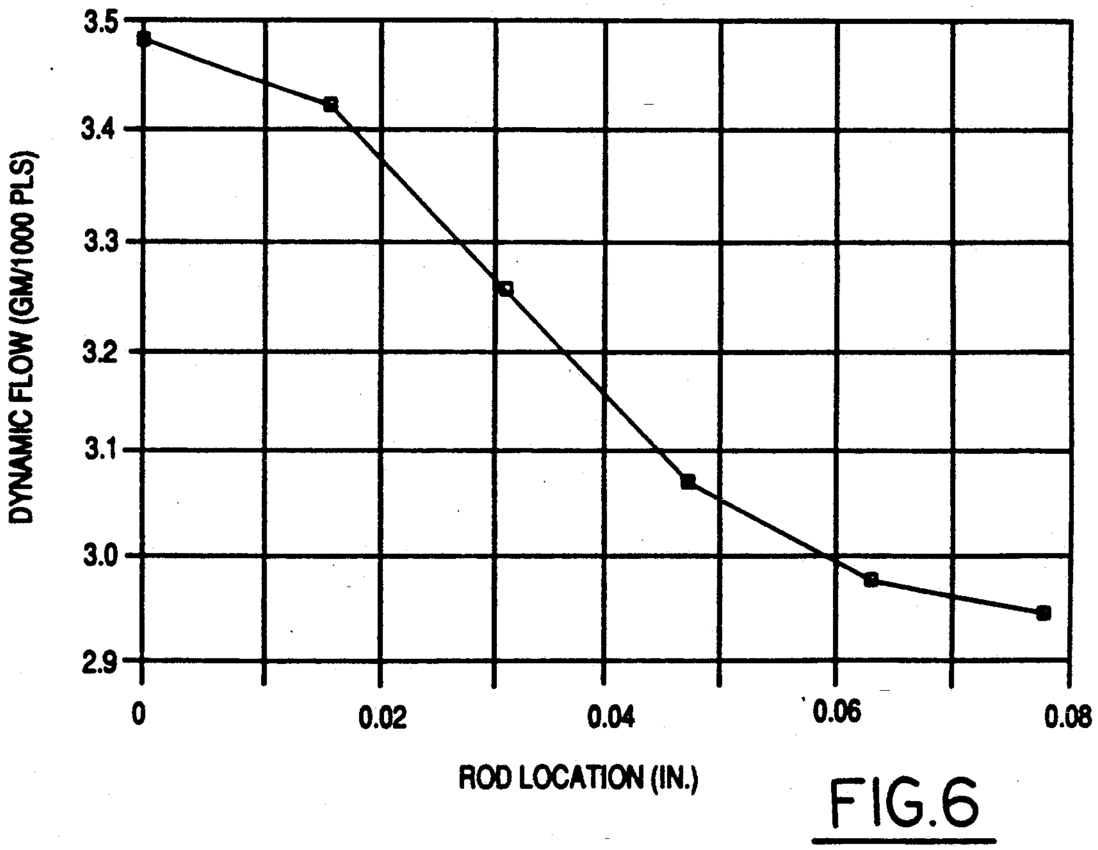
Figure 7:
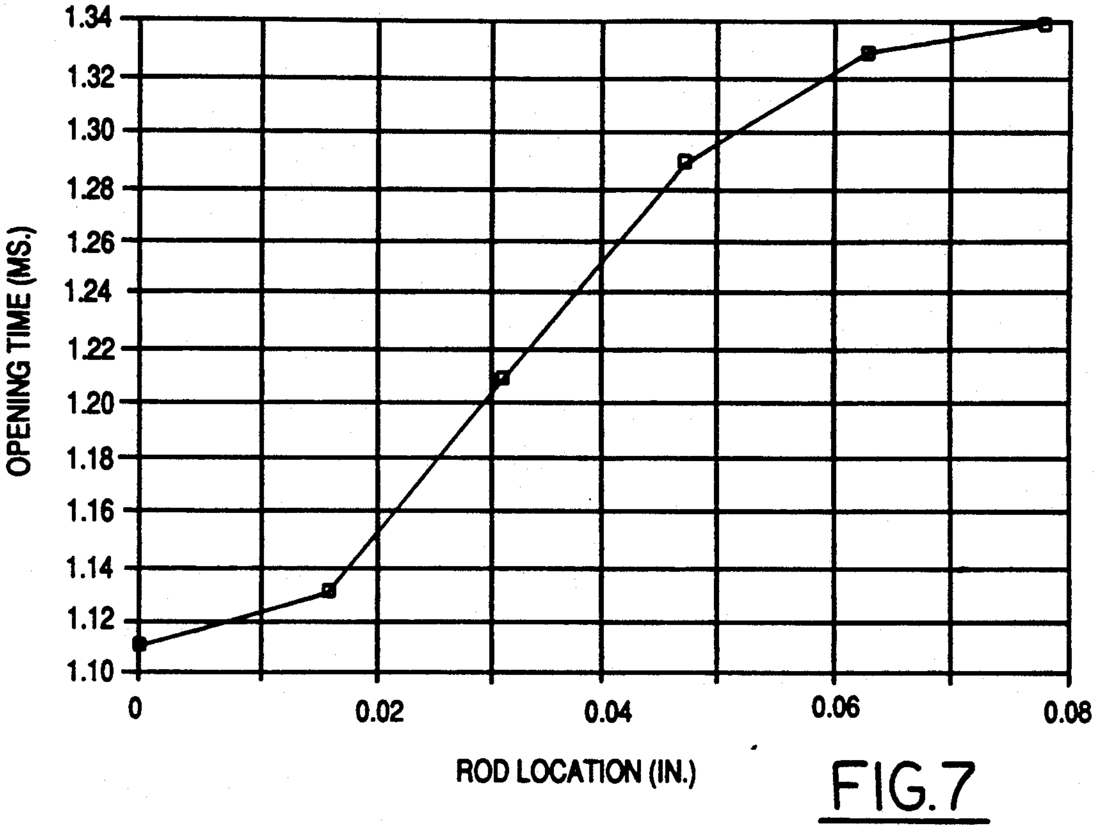
Figure 8:
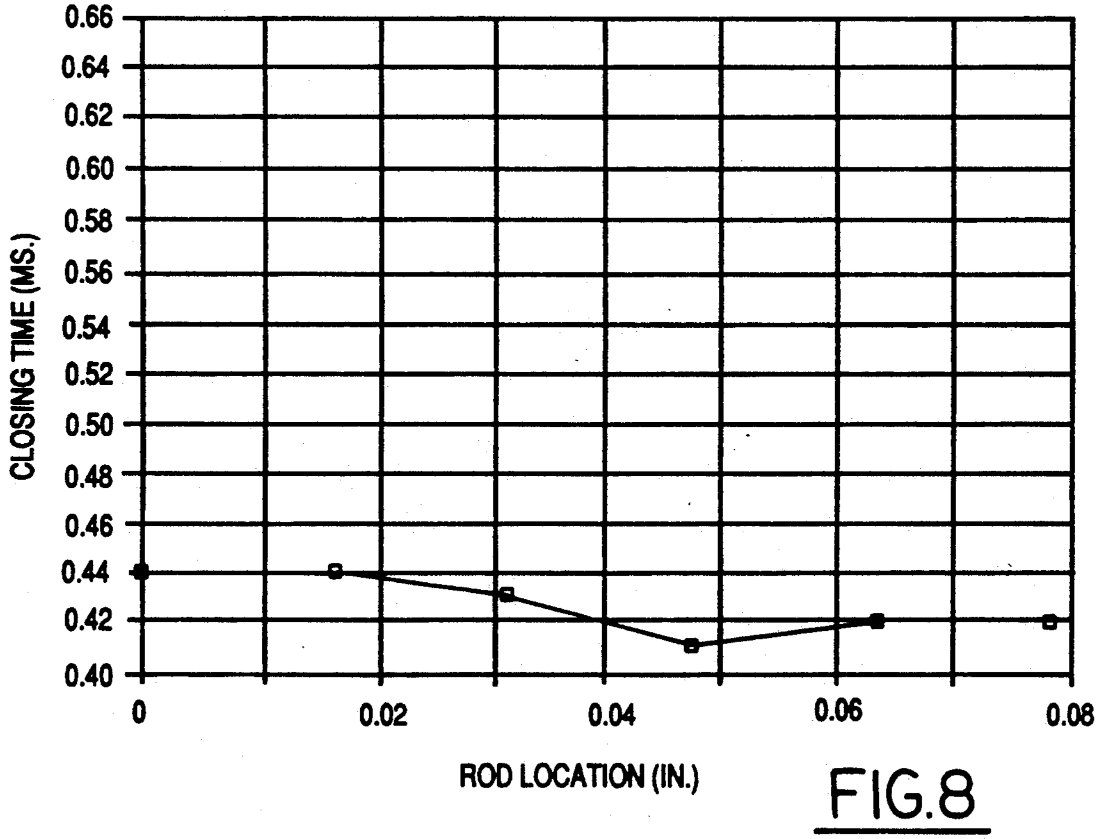
Figure 9:
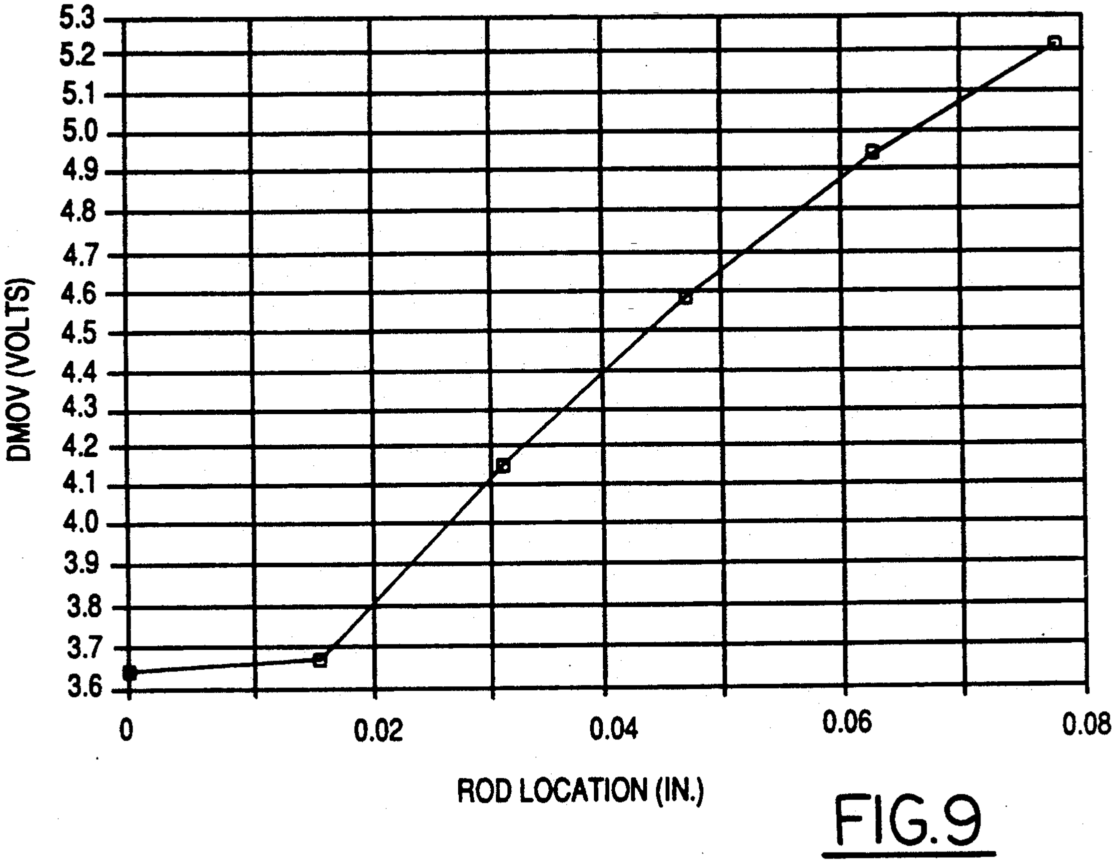

FIGS. 3 and 4 illustrate the application of the invention to a top-feed type fuel injector. Like components in FIGS. 1-4 are designated by like reference numerals, and therefore a detailed description of FIGS. 3 and 4 is not given in the interest of conciseness. The dynamic calibration mechanism is essentially identical for both top- and bottom-feed versions. Since the fuel inlet of the top-feed, which is designated by the numeral 24 as were the inlet holes for the bottom-feed, is at the top of the fuel injector, access to the control rod for advancing it into the fuel injector is through the fuel inlet tube 24 which is coaxial with axis 14 and is part of stator 28.

In both versions, the various parts of the magnetic circuit are constructed from suitable materials and where the parts are exposed to fuel, they are constructed from materials that are also fuel-impervious. Thus, armature 30, body 12, and stator 28 may be magnetic stainless steels while tube 86 is a non-magnetic stainless steel. The control rod 80, which of course must be magnetically permeable, may be a magnetic stainless steel.

FIGS. 5-9 are self-explanatory graph plots illustrating the effectiveness of dynamic flow calibration in accordance with principles of the invention applied to an actual example.

The organization and arrangement of the illustrated fuel injectors provide for compactness and for assembly processing by automated assembly equipment. The overall fabrication process can be conducted in an efficient manner, and the organization and arrangement are highly conducive to fuel injector miniaturization. While a presently preferred embodiment of the invention has been illustrated and described, it should be appreciated that principles are applicable to other embodiments.

What is claimed is:

1. A method for dynamic flow calibration of a fuel injector which has a body containing an actuating mechanism comprising a selectively energizable solenoid coil assembly that operates a valve element via an armature means to selectively seat and unseat said valve element on and from a valve seat on said body to selectively open and close the fuel injector to fuel flow, said solenoid coil assembly comprising a selectively energizable solenoid coil for generating magnetic flux and a stator for conducting the magnetic flux to said armature means across an axial working gap between said stator and said armature means, said method comprising operating the fuel injector under a given set of operating conditions and measuring the fuel injector's dynamic flow under that set of operating conditions, comparing the dynamic flow thus measured with a desired dynamic flow, and if the measured dynamic flow fails to comply with the desired dynamic flow, then securing compliance by selectively diverting some of the magnetic flux from said working gap by causing the diverted magnetic flux to pass directly between said stator and said armature means without passing through said working gap.

2. A method as set forth in claim 1 in which the step of selectively diverting some of the magnetic flux from said working gap by causing the diverted magnetic flux to pass directly between said stator and said armature means without passing through said working gap comprises selectively positioning a control rod means that passes through holes in both said stator and said armature means so that the diverted flux which is conducted between said stator and said armature means is conducted through said control rod means without passing through said working gap.

3. A method as set forth in claim 2 including the step of immovably joining said control rod means to said stator once said compliance has been attained.

4. A method as set forth in claim 3 in which the step of immovably joining said control rod means to said stator comprises crimping a portion of said stator to a portion of said control rod means.

5. A method as set forth in claim 1 in which the step of selectively diverting some of the magnetic flux from said working gap by causing the diverted magnetic flux to pass directly between said stator and said armature means without passing through said working gap comprises selectively axially positioning with respect to said stator and said armature means a circular cylindrical control rod that passes axially through coaxially aligned circular holes in both said stator and said armature means so that the diverted flux which is conducted between said stator and said armature means is conducted through said circular cylindrical control rod without passing through said working gap.

6. A method as set forth in claim 1 in which the step of selectively diverting some of the magnetic flux from said working gap by causing the diverted magnetic flux to pass directly between said stator and said armature means without passing through said working gap comprises selectively axially positioning a circular cylindrical control rod with respect to said stator and said armature means by selectively axially positioning said circular cylindrical control rod coaxially within a non-magnetic circular tube which itself extends between and enters coaxially aligned circular cylindrical holes in both said stator and said armature means so that the diverted flux which is conducted between said stator and said armature means is conducted through said circular cylindrical control rod without passing through said working gap.

7. A fuel injector which has a body containing an actuating mechanism comprising a selectively energizable solenoid coil assembly that operates a valve element via an armature means to selectively seat and unseat said valve element on and from a valve seat on said body to selectively open and close the fuel injector to fuel flow, said solenoid coil assembly comprising a selectively energizable solenoid coil for generating magnetic flux and a stator for conducting the magnetic flux to said armature means across an axial working gap between said stator and said armature means, characterized by means for securing compliance with a desired dynamic flow calibration comprising means for selectively diverting some of the magnetic flux from said axial working gap such that the diverted magnetic flux passes directly between said stator and said armature means without passing through said working gap.

8. A fuel injector as set forth in claim 7 in which said means for selectively diverting some of the magnetic flux from said working gap comprises a control rod means that passes through holes in both said stator and said armature means so that the diverted flux which is conducted between said stator and said armature means is conducted through said control rod means without passing through said working gap.

9. A fuel injector as set forth in claim 8 in which said control rod means is immovably joined to said stator.

10. A fuel injector as set forth in claim 9 in which said control rod means is immovably joined to said stator by means of a crimp.

11. A fuel injector as set forth in claim 8 in which said control rod means comprises a circular cylindrical control rod and said holes in said stator and said armature means comprise coaxially aligned circular cylindrical holes.

12. A fuel injector as set forth in claim 11 including a non-magnetic circular cylindrical tube which extends between and enters said holes in said stator and said armature means and within which said control rod is disposed.

13. A fuel injector as set forth in claim 12 in which said non-magnetic tube is constructed and immovably joined with said stator in such a manner that said control rod is prevented from being wetted by fuel within the fuel injector, and that portion of said non-magnetic tube which enters said hole in said armature means provides axial guidance for said armature means.

* * * * *